United States Patent [19]

Yamamoto et al.

[11] 4,393,540

[45] Jul. 19, 1983

[54] DETACHABLE HANDLE HAVING A PIVOTAL PART

[75] Inventors: Toshiharu Yamamoto; Manabu Sato, both of Yokohama; Katsuya Akiba, Abiko; Koreyoshi Abe, Matsudo, all of Japan

[73] Assignee: Victor Company of Japan, Limited, Tokyo, Japan

[21] Appl. No.: 283,552

[22] Filed: Jul. 15, 1981

[30] Foreign Application Priority Data

Jul. 16, 1980 [JP] Japan .................. 55-100335[U]

[51] Int. Cl.³ ............................... B25G 3/18
[52] U.S. Cl. .................. 16/114 R; 16/126; 294/27 R
[58] Field of Search ........ 16/114 R, 115, 126, 16/DIG. 15, DIG. 19, DIG. 24, DIG. 25, DIG. 40; 294/27 R, 27 H, 28, 33; 190/58 A

[56] References Cited

U.S. PATENT DOCUMENTS

| | | | |
|---|---|---|---|
| 341,619 | 5/1886 | Wood | 16/114 R X |
| 3,451,590 | 6/1969 | Johnson et al. | 16/115 X |
| 3,484,894 | 12/1969 | Fletcher | 16/114 R |
| 3,876,127 | 4/1975 | Hares et al. | 16/114 R X |
| 4,196,821 | 4/1980 | Teti, Jr. et al. | 16/126 |

FOREIGN PATENT DOCUMENTS 2520025 11/1976 Fed. Rep. of Germany ... 294/27 H

*Primary Examiner*—Fred Silverberg
*Attorney, Agent, or Firm*—Lowe, King, Price & Becker

[57] ABSTRACT

A detachable carrying handle comprising a web section and a pair of parallel limb sections for carrying a portable equipment having on each side a recess and a projection which is aligned with the projection on the other side. Each limb section comprises a first part connected to the web section and a second part pivotally connected to the first part. The first part is formed with a longitudinally extending recess into which the projection is inserted by moving the handle in a direction away from the equipment and a pin which is transversely releasably received in the equipment recess. The upper edge of the second part is urged about its pivot by a spring toward the equipment and is engageable with the projection when the latter is received in the longitudinal recess so that the handle is held in an upright position. The handle can be tilted sideways with a force sufficient to disengage the pin from the equipment recess and can be detached from the equipment by pivotally rotating the second part against the spring and moving the handle in a direction toward the equipment.

4 Claims, 5 Drawing Figures

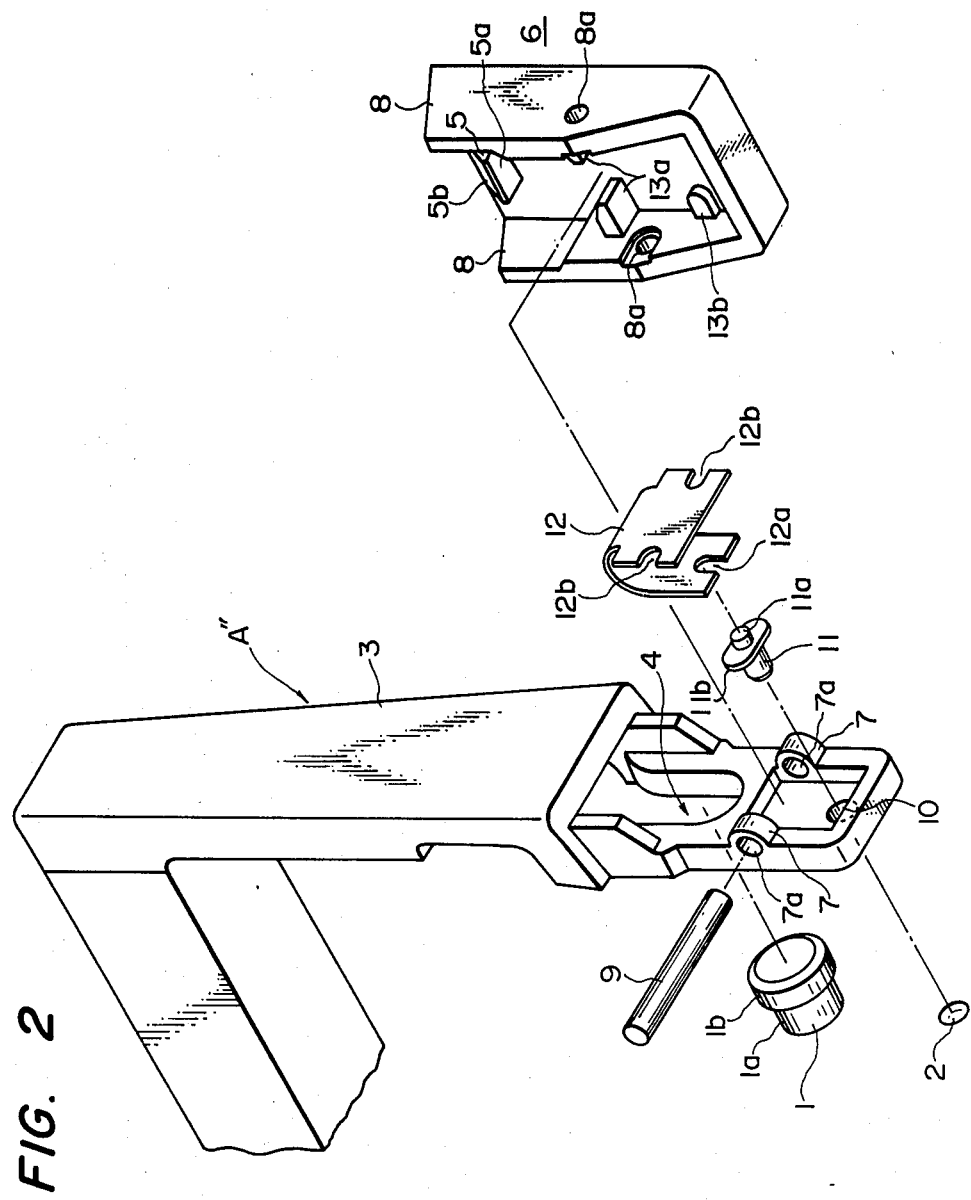

DETACHABLE HANDLE HAVING A PIVOTAL PART

BACKGROUND OF THE INVENTION

The present invention relates to a detachable carrying handle for use in carrying a portable equipment such as video tape recorders and radio receivers.

Conventional carrying handles are held in an upstanding position by means of a clamping screw provided on each side of the equipment to be carried. This requires a manual operation each time the handle is readjusted to the upstanding position. Further the conventional carrying handle is incapable of being detached from the portable equipment in a single operation.

Another prior art device which would solve these problems involves the use of a stopper located on each side of the equipment to hold the handle slightly tilted to the vertical. However, there is a likelihood of the handle being damaged by the stoppers if the handle is rotated with an excessive thrust.

SUMMARY OF THE INVENTION

An object of the present invention is therefore to provide a detachable carrying handle for portable equipment which only requires a single manual operation for attaching the handle to or detaching it from portable equipment or tilting the handle with respect to the equipment.

According to the present invention the detachable carrying handle comprises a web section and a pair of parallel limb sections for carrying a portable equipment. The portable equipment has on each side thereof facing each limb section a recess and a projection which is axially aligned with the projection on the other side. Each of the limb sections includes a first part connected at one end to the web section and a second part pivotally connected to the other end of the first part. The second part forming an elongated side member with the first part. The first part includes a pin for transversely releasably engaging into the recess of the equipment and a longitudinally extending recess for allowing the projection to be inserted thereinto when the handle is moved in a direction parallel to the direction of elongation of the side member and for maintaining the handle in an upright position conjointly with the pin while allowing the handle to pivotally rotate about the axis of the aligned projections when the pin is disengaged from the equipment recess. A spring is included for urging the second part about its pivot toward the equipment. The second part is engageable with the projection after the latter is inserted into the longitudinal recess to prevent the handle from detaching from the equipment if the handle is caused to move in a direction opposite to the direction of insertion of the projection into the longitudinal recess and is disengageable from the projection when pivotally rotated against the spring to allow the handle to be detached from the equipment.

Preferably the second part is formed with a camming surface for making camming contact with one edge of the projection when the same is being inserted into the longitudinal recess and a contact surface opposite to the camming surface for making contact with an opposite edge of the projection when the same is received in the longitudnal recess whereby the handle is attached smoothly to the equipment by a single sliding action.

BRIEF DESCRIPTION OF THE DRAWINGS

The present invention will be further described by way of example given with reference to the accompanying drawings, in which:

FIG. 2 is an illustration of an exploded, partial view of the handle of FIG. 1 with a projection and a recess provided on each side of the video tape recorder;

DETAILED DESCRIPTION

Figure 1:
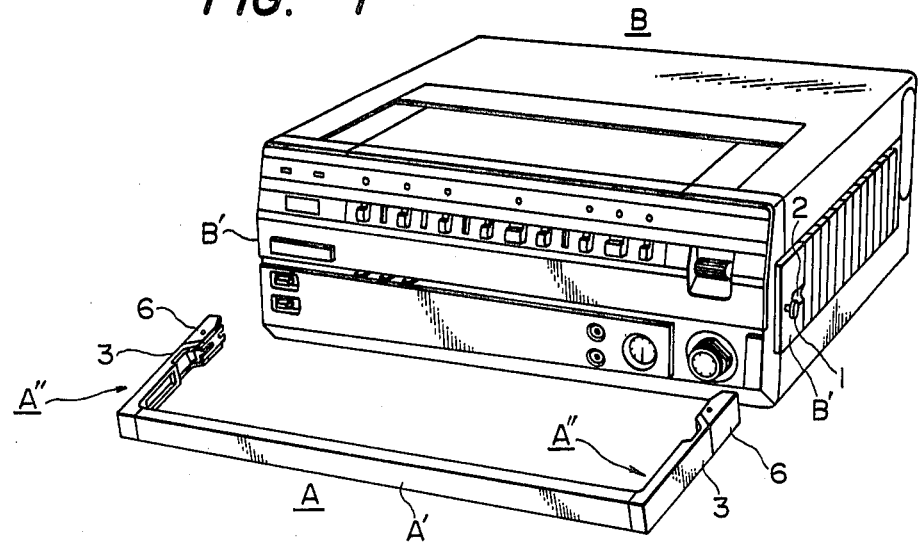
FIG. 1 is an illustration of the carrying handle of the invention in relation to a portable video tape recorder which is to be carried by the handle.

In FIG. 1 a carrying handle A of the invention is shown detached from a portable equipment B which is to be carried by the handle A, the equipment B being a portable video tape recorder for the purpose of illustration. The carrying handle A comprises a web section A' and a pair of limb sections A" to form a generally U-shaped construction. Each limb section comprises a first part 3 and a second part 6 which is pivotally connected to the first part 3 and forms an elongated side member with the first part 3. The equipment B is formed on each side B' with a projection 1 and a recess 2, the projection on each side being axially aligned with the projection on the other. As clearly shown in FIG. 2, the projection 1 is formed with a small diameter portion 1a and a large diameter portion 1b and the recess 2 is located below the projection 1 when the equipment B is in an upright position. The first part 3 is formed by an elongated member extending over the length of the limb section A". The second part 6 extends along the lower section of the first part 3 and is snugly fitted thereto to define a substantially common plane on all sides with the upper section of the first part 3. This is accomplished by offsetting the lower section of the first part 3 with respect to the inner walls of the second part 6.

The first part 3 of the limb section is formed with a longitudinally extending recess 4 which terminates in a semi-circular shape at a position above a pin 11. The pin 11 is resiliently received in a hole 10 provided at the lower end portion of the first part 3. The pin 11 is formed with a smaller diameter portion 11a on which an abutment 11b is secured. A pair of trunnions 7 having aligned holes 7a is provided between the recess 4 and the hole 10 to receive a transverse pivot shaft 9. The second part 6 is formed with a hole 8a on each of its sides 8 to receive the pivot shaft 9 when the second part 6 is fitted to the first part 3.

An upwardly convexed leaf spring 12 is accommodated between the opposed inner walls of the first and second parts 3, 6. The leaf spring 12 includes a lower notch 12a on a side facing the first part 3 for engaging with the smaller diameter portion 11a of the pin 11 to urge it resiliently into the equipment recess 2 and a pair of lateral notches 12b on opposite edges for engaging with side projections 13b provided on the inner side walls of the second part 6, so that the spring 12 is compressed to give a counterclockwise thrust to the second part 6 about the pivot 9 to urge its upper end toward the equipment B. Further projections 13a on the second part 6 serve to hold the spring 12 in position.

According to a feature of the invention, the second part 6 is formed with a locking element 5. Preferably the locking element 5 is formed with a lower contact face 5a and an upper or inclined camming surface 5b whose operation will be described hereinbelow.

Figure 3:
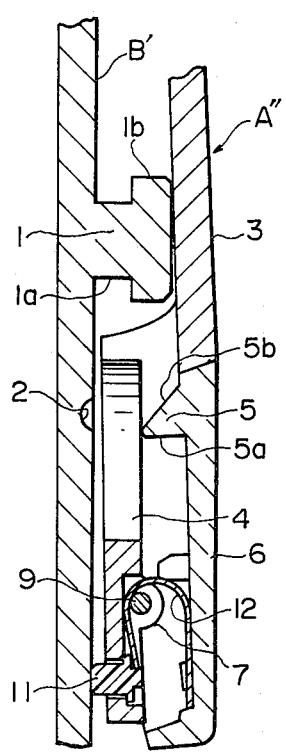
FIG. 3 is an illustration of a cross-section of a limb section of the handle in relation to the projection when the handle is positioned for engagement with the recorder equipment.
Figure 4:
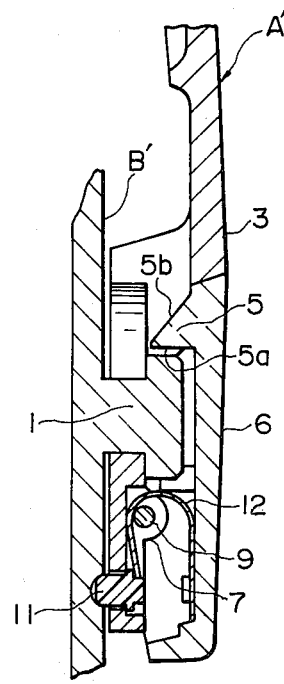
FIG. 4 is an illustration of a cross-section of the limb section when the handle is engaged with the equipment.

When attaching the carrying handle A to the equipment B, the handle is positioned so that its limb sections A" are aligned in a direction both substantially parallel to the sides B' of the equipment and to the projections 1 and recesses 2 so that the camming face 5b of the locking element 5 is positioned below the larger diameter section 1b of projection 1 with the longitudinal recess 4 below the smaller diameter section 1a, as illustrated in FIG. 3. When the handle is moved upward the upper face 5b of the locking element comes into camming engagement with the lower edge of the larger diameter section 1b urging the second part 6 in a direction away from the equipment B against the action of spring 12, so that the handle is finally locked in place when the face 5a engages the upper edge of the projection's larger diameter section 1b and when the projection's smaller diameter section 1a is fully inserted into the recess 4 with the pin 11 being received in the equipment recess 2, as shown in FIG. 4. Under this condition the contact face 5a is in contact with the larger diameter section 1b at a point opposite to the contact between the part-circular inner wall of the recess 4 and the smaller diameter section 1a of projection 1, and the handle is locked in place in vertical directions. The handle A can be tilted in opposite directions by moving the web section A' in a desired direction with a force sufficient to disengage the pin 11 from the equipment recess 2. The handle is thus allowed to rotate through a limited angle about the axis of the aligned projections 1 but prevented from decoupling from the equipment since each projection keeps contact on its circumference with the contact face 5a and the recess 4.

Figure 5:
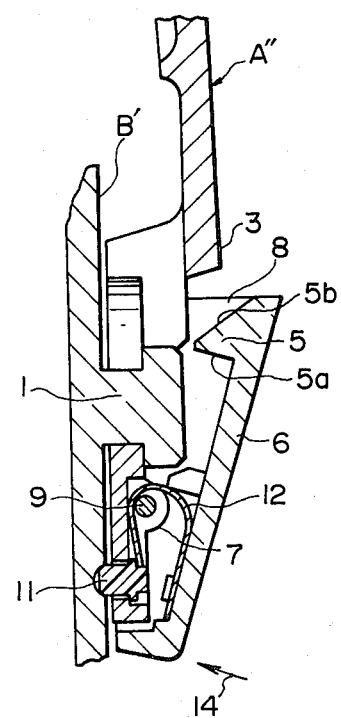
FIG. 5 is an illustration of the limb section when the handle is being detached from the equipment.

If desired the handle A can be decoupled from the equipment B in a single operation. This is accomplished by pushing the lower end of the second part 6 toward the equipment as indicated by arrow 14 in FIG. 5 and moving the handle downward. The locking element 5 is disengaged from contact with the projection 1 so that the latter is allowed to disengage from contact with the recess 4 as the handle is moved downward.

What is claimed is:

1. A detachable carrying handle comprising a web section and a pair of parallel limb sections extending in a longitudinal direction for carrying a portable equipment, said portable equipment having on each side thereof facing each of said limb sections a recess and a projection, the projection on one side is aligned along an axis with the projection on the other side, each of said limb sections including a first part connected at one end to said web section and a separate second part pivotally connected to the other end of said first part, said first part including a pin for transversely releasably engaging into said recess of said equipment and a longitudinally extending recess, said projection being inserted into the longitudinal recess and then slidably moved in the longitudinal direction in the longitudinal recess when said handle is moved in a direction parallel to the longitudinal direction to thereby maintain said handle in an upright position conjointly with said pin while allowing said handle to pivotally rotate about the axis when said pin is disengaged from said equipment recess, and means for urging the portion of said second part adjacent to said first part toward said equipment, said second part being engageable with said projection after said projection is inserted and slidably moved in the longitudinal direction in said longitudinal recess to prevent said handle from detaching from said equipment recess if said handle is moved in a direction opposite to the longitudinal direction and disengageable from said projection when pviotally rotated about a pivot against said urging means to allow said handle to be detached from said equipment by being moved in a direction opposite to the longitudinal direction.

2. A detachable carrying handle as claimed in claim 1, wherein said first and second parts are in a substantially common plane when said second part is in engagement with said projection.

3. A detachable carrying handle as claimed in claim 1 or 2, wherein said pin is located below said longitudinal recess when said handle is in the upright position and wherein the pivot is located between said longitudinal recess and said pin.

4. A detachable carrying handle as claimed in claim 1 or 2, wherein said second part is formed with a camming surface for making camming contact with one edge of said projection after the projection is inserted and slidably moved in the longitudinal direction in said longitudinal recess and a contact surface opposite to said camming surface for making contact with an opposite edge of said projection after the projection has been inserted and slidably moved in the longitudinal direction in said longitudinal recess.

* * * * *

UNITED STATES PATENT OFFICE
CERTIFICATE OF CORRECTION

Patent No. 4,393,540          Dated   July 19, 1983

Inventor(s)  Toshiharu Yamamoto, Manabu Sato, Katsuya Akiba, Koreyoshi Abe

It is certified that error appears in the above-identified patent and that said Letters Patent are hereby corrected as shown below:

Cover page, Item [73], Assignee data, following "Limited," insert --Yokohama, Japan, and Kabushiki Kaisha Asahi,--.

Signed and Sealed this

Eleventh Day of October 1983

[SEAL]

Attest:

GERALD J. MOSSINGHOFF

Attesting Officer      Commissioner of Patents and Trademarks